United States Patent
Meis et al.

(10) Patent No.: US 6,266,607 B1
(45) Date of Patent: Jul. 24, 2001

(54) PROCESS FOR SELECTING THE TRAFFIC INFORMATION TRANSMITTED BY A TRAFFIC INFORMATION CENTER WHICH CONCERNS A ROUTE OF A VEHICLE EQUIPPED WITH A TERMINAL IN A ROAD NETWORK

(75) Inventors: Josef Meis, Münster; Andreas Parra, Hamburg; Peter Stangier, Wesseling, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/331,137

(22) PCT Filed: Nov. 27, 1997

(86) PCT No.: PCT/DE97/02815

§ 371 Date: Jul. 13, 1999

§ 102(e) Date: Jul. 13, 1999

(87) PCT Pub. No.: WO98/27527

PCT Pub. Date: Jun. 25, 1998

(30) Foreign Application Priority Data

Dec. 16, 1996 (DE) .............................. 196 53 693
Nov. 10, 1997 (DE) .............................. 197 50 775

(51) Int. Cl.$^7$ .............................. G06F 19/00; G06G 7/70
(52) U.S. Cl. .......................... 701/117; 701/209; 340/995
(58) Field of Search .................................. 701/117, 206, 701/201, 209; 340/995

(56) References Cited

U.S. PATENT DOCUMENTS

| | | | |
|---|---|---|---|
| 5,406,491 | * | 4/1995 | Lima ...................................... 364/449 |
| 5,543,802 | * | 8/1996 | Villevieille et al. ................... 342/357 |
| 5,712,632 | * | 1/1998 | Nishimura et al. ................... 340/995 |
| 5,892,463 | * | 4/1999 | Hikita et al. .......................... 340/995 |
| 5,908,464 | * | 6/1999 | Kishigami et al. ................... 701/208 |
| 5,953,722 | * | 9/1999 | Lampert et al. ....................... 707/100 |

* cited by examiner

Primary Examiner—William A. Cuchlinski, Jr.
Assistant Examiner—Olga Hernandez
(74) Attorney, Agent, or Firm—Cohen, Pontani, Lieberman & Pavane

(57) ABSTRACT

A suitable selection of information sent by a central traffic station with respect to its relevance for a route of a vehicle with a terminal unit through the traffic network is made possible by a terminal unit and by a process for the selection of traffic information which is relevant to a route of a vehicle in a traffic network, which vehicle has a terminal unit, and which is transmitted by a central station. The route is determined in the form of path points between a starting point and a destination in the traffic network. A zone is defined for the selection of relevant traffic information between two path points. Traffic information concerning a location in the zone is selected as relevant, while traffic information concerning a location outside of the zone is defined as irrelevant.

16 Claims, 2 Drawing Sheets

IRRELEVANT

PROCESS FOR SELECTING THE TRAFFIC INFORMATION TRANSMITTED BY A TRAFFIC INFORMATION CENTER WHICH CONCERNS A ROUTE OF A VEHICLE EQUIPPED WITH A TERMINAL IN A ROAD NETWORK

BACKGROUND OF THE INVENTION

1. Field of the Invention

The invention is directed to a process for selecting traffic information which concerns a route of a vehicle with a terminal unit in a traffic network and which is transmitted by a central station and further is directed to a terminal unit and a central station for carrying out the process.

2. Discussion of the Prior Art

A route through the traffic network from a desired starting location to a desired target location can be determined for a vehicle with a terminal unit in a central traffic station based on distances and current traffic information such as traffic backups, etc. and transmitted to the terminal unit. It is also possible to determine in the terminal unit a route between a desired starting point and an end point in the traffic network. In particular, traffic information concerning a location at a great distance from the current location is of secondary importance for the decision about updating a route. When a complete map of the traveled traffic network is contained in the terminal unit, it is possible for traffic information sent from the central traffic station and received in the terminal unit to be allocated to determined roads or cities, etc. In the absence of a complete digital map of the traveled traffic network, it is not possible for roads to which traffic information relates to be identified in the terminal unit for a relevance check for the current route.

SUMMARY OF THE INVENTION

It is the object of the present invention to enable the simplest and most efficient possible relevance check of traffic information taking into account a route through the traffic network which is traveled by the vehicle with a terminal unit.

The process according to the invention for selecting traffic information (such as information regarding backed-up traffic, traffic volume, travel times) which concerns a route of a vehicle with a terminal unit in a traffic network and which is transmitted by a central station enables a simple, efficient and error-proof allocation of received traffic information, including a relevance check with respect to the traveled route, even in the absence of a digital map of the traffic network or when the digital map is incomplete. The definition of a zone, especially a corridor, between two path points of a route defined by path points enables a continuously suitable selection of traffic information along the route. Selected traffic information can be displayed particularly to the user of the terminal unit optically and/or acoustically so that the user is spared insignificant traffic information. Further, traffic information which is selected as important for the route can be used to judge the need for a recalculation of the route, which is substantially more favorable with respect to telecommunications costs than continuous interactive communication between the terminal unit and the central traffic station as regards route recalculation. A route recalculation can be carried out in a central traffic station, which has the advantage that current traffic information is locally allocated and incorporated in an optimum manner in the central traffic station with extensive calculating effort and that a very detailed map of the traffic network is required only in the central traffic station. A route recalculation can also be carried out in the terminal unit, which enables greater autarky.

One zone is advisably defined between every two successive path points of the entire route.

Zones, especially corridors, are advisably defined in the terminal unit based on the path points of the suggested route which are transmitted with their geographic positions (especially geographic longitude and latitude rounded off in a predetermined manner).

The zone between two path points is advisably defined as a corridor between two straight lines which extend parallel to a connection line (especially a straight line) between every two path points at a predetermined or predeterminable distance from the connection line. A zone of this kind can easily be calculated in particular in the terminal unit and makes it possible to check in a simple manner whether or not transmitted traffic information is in this zone. There is accordingly a roughly rectangular partial corridor between two path points.

According to one embodiment of the invention, the spacing of the two parallel lines relative to the connection line between every two path points remains unchanged. This enables a simple calculation. Further, it is possible to increase the spacing as the distance from the current location increases in order to take into account the fact that, at a great distance, traffic information about locations at a greater distance from the route can be significant up to the point that the vehicle has moved ahead to these locations because backups, etc. can propagate up to the route during the travel period.

The transmission of traffic information such as traffic backup reports, average speeds, travel times, accidents, etc. from the central traffic station to the terminal unit is advisably carried out with a designation of the road, roads, road sections, cities, etc. to which the traffic information relates. Alternatively, or in addition, it is advantageous to indicate location for traffic information in particular as geographic longitude and latitude of the location or locations to which the traffic information relates.

The transmission of traffic information and/or route data and/or an inquiry from the terminal unit to the central traffic station concerning a new calculation of the route is advisably carried out by radio, especially mobile radio.

The route information defining path points of a route is advisably transmitted from the central station to the terminal unit by radio, especially by mobile radio, in the case of route calculation in the central station. Traffic information for the traffic situation can be transmitted by radio; it can also be transmitted in particular by mobile radio, especially as a mobile radio short message (GSM SMS). Traffic information can also be sent in a locally limited manner in particular, for example, in locally defined GSM SMS pages.

Further features and advantages of the invention follow from the description of an embodiment example with reference to the drawing.

DETAILED DESCRIPTION OF THE PREFERRED EMBODIMENT

A user of a terminal unit in a vehicle enters the starting point and the destination of his trip into the terminal unit.

The terminal unit transmits the starting point and end point to a central traffic station, not shown. The central traffic station determines a route for the vehicle through the traffic network for the starting point and destination (i.e., end point), wherein traffic information concerning backups, accident scenes, detours, travel speeds, traffic volume, etc. are taken into account in the central traffic station. The calculated route is transmitted from the central traffic station to the vehicle through route information which defines path points along the route. In particular, path points can be defined where a road along a route changes its name because of a turn-off, renamed road, etc. This is especially advantageous for a terminal unit without a digital map of the traffic network. A route is accordingly given as a chain of path points between the starting point and the destination of the desired journey through the traffic network. In particular, the name of the road to be traveled between two path points can be transmitted from the central station to the terminal unit for route information defining the path points of the route. Alternatively, or in addition, geographic information on a respective path point, especially its geographic longitude and latitude rounded off to a given length can be transmitted. While traveling along the route, a driver receives traffic information by radio and/or mobile radio from the central traffic station, especially regarding backups, etc. This traffic information can be displayed to the driver and/or used as a basis for a decision about a recalculation of a route due to backed-up traffic, etc. The traffic information sent by the central station is selected in the terminal unit in order to prevent the driver from being unnecessarily burdened with traffic information which is definitely irrelevant based on the driver's route.

Figure 1:
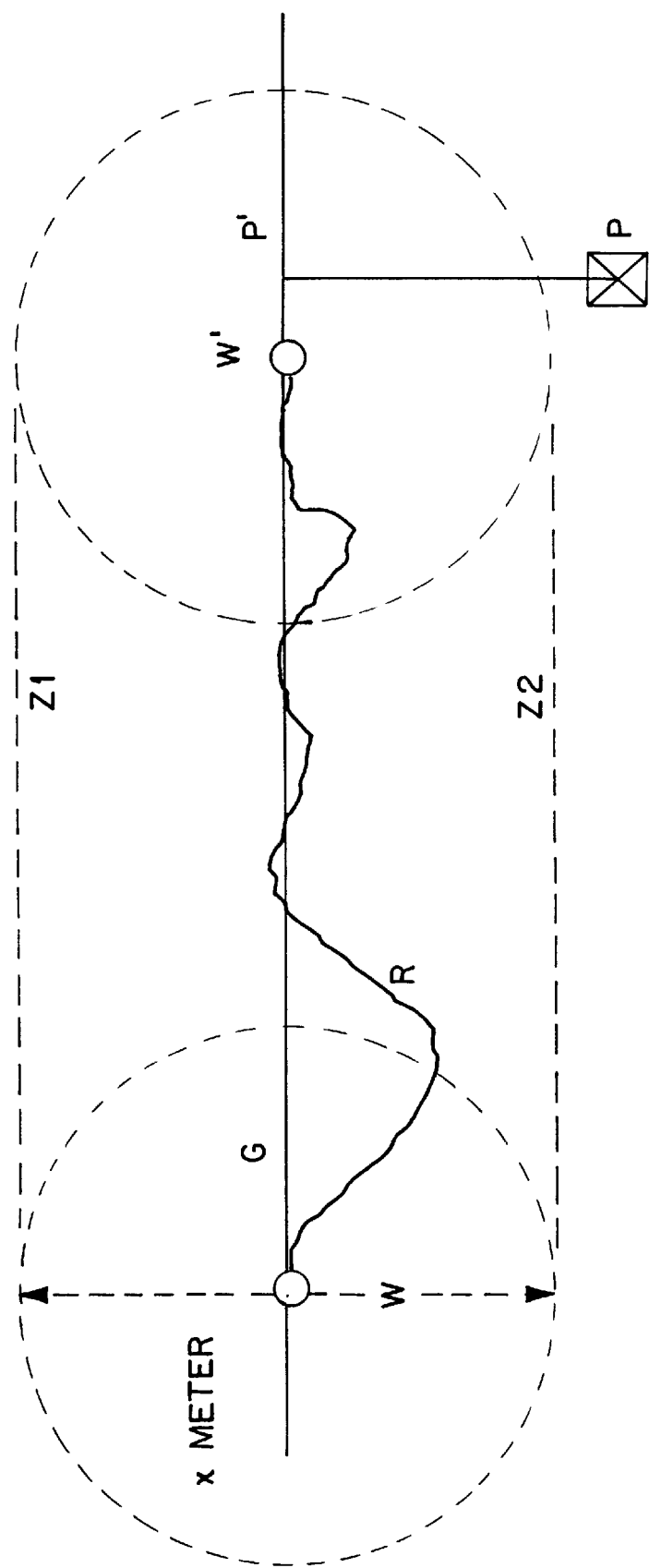
FIG. 1 shows an example of traffic information which is selected as irrelevant for the route of a vehicle.

FIG. 1 shows two path points W and W' which define a partial segment of the route of the vehicle through the traffic network. A straight line G is drawn between these two path points W and W'. Traffic information concerning a point P whose distance from the straight line G lies above a predetermined or predeterminable limit is selected as irrelevant; traffic information about a location P whose distance from the straight line G lies below a predetermined limit is selected as relevant, whereupon it is displayed to the user or can form the basis for a decision about a route recalculation, for example.

FIG. 1 shows traffic information (about a location P) whose distance from the straight line G lies above a limit of x/2 meter so that the traffic information relating to point P is selected as irrelevant. In the example shown in FIG. 2, the traffic information relates to a location P whose distance from the straight line G lies below a limit, that is, is at a distance below x/2 meters, so that the traffic information is selected as relevant.

The distance of point P from the straight line G can be determined in particular based on geographic coordinates of W, W', P.

Figure 2:
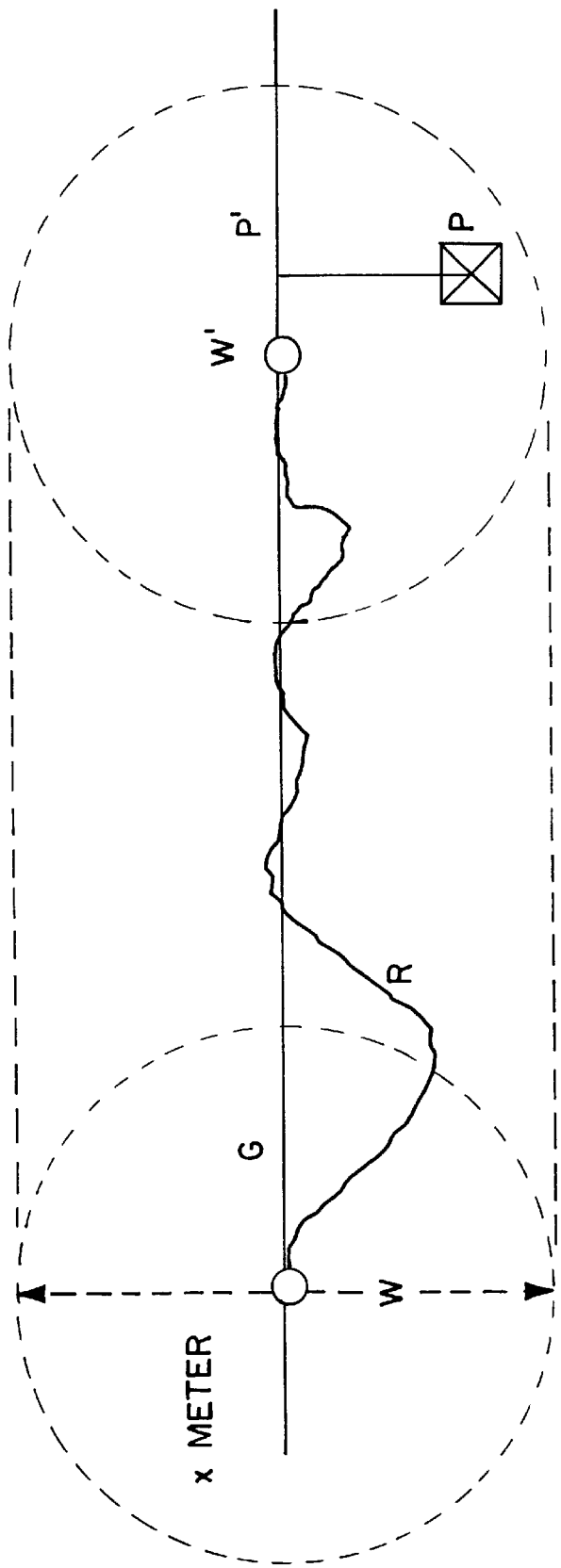
FIG. 2 shows an example of traffic information that is selected as relevant.

Since, in the example shown in FIGS. 1 and 2, the criterion for the decision about the relevance of traffic information for the route is the distance from a straight line between two path points W and W', the zone in which traffic information is relevant is, this case, roughly a rectangle which is defined by two parallel lines Z1 and Z2 relative to the straight line G between the two path points W, W' (and by lines orthogonal to G through path points W, W'). Since additional path points for the suggested route are located to the left and to the right of W and W' in FIGS. 1, 2, there results for the route as a whole a corridor along the suggested route as a zone within which traffic information is relevant.

The suggested route extends between path points W and W' along line R in FIGS. 1 and 2; the curvature of the partial route R is caused by the curves of a road, etc.

The invention can be implemented in a terminal unit and/or in a central station especially as a program. In particular, program parts for the selection of traffic information which relates to a zone between two path points are to be implemented in the terminal unit. An arrangement as electronic circuit is also possible.

What is claimed is:

1. A terminal unit, comprising:
    a storage with a program for carrying out a process for selecting traffic information which is relevant for a route of a vehicle in a traffic network, which is transmitted by a central station, the process including determining the route in a form of path points between a starting point and a destination in a traffic network, defining a zone for selecting relevant traffic information between two path points, defining traffic information concerning a location in the zone as relevant, and defining traffic information concerning a location outside of the zone as irrelevant;
    a processor for running the program;
    a communications device for receiving at least one of traffic information and route information from the central traffic station; and
    user interface for supplying a user of the terminal unit with information, the interface being at least one of optical and acoustic.

2. A process for selecting traffic information which is relevant for a route of a vehicle in a traffic network, which vehicle has a terminal unit, and which is transmitted by a central station, the process comprising the steps of:
    determining the route in a form of path points between a starting point and a destination in a traffic network;
    defining a zone for selecting relevant traffic information between two path points;
    defining traffic information concerning a location in the zone as relevant;
    defining traffic information concerning a location outside of the zone as irrelevant; and
    supplying traffic information selected as relevant to a user of the terminal unit one of optically and acoustically.

3. A process according to claim 2, including judging a necessity for a route recalculation using only traffic information selected as relevant.

4. A process according to claim 2, including carrying out a route calculation in the central traffic station.

5. A process according to claim 2, including carrying out the transmission of traffic information with a designation of one of roads and road sections to which the traffic information relates.

6. A process according to claim 2, including carrying out the transmission of traffic information with an indication of geographic location of one of a location and an area to which the traffic information relates.

7. A process according to claim 2, including transmitting route information defining path points from the central station to the terminal unit by radio.

8. A process according to claim 2, wherein path points are defined where designations of roads change along the route.

9. A process according to claim 2, including transmitting traffic information concerning a traffic situation as a radio broadcast.

10. A process according to claim 9, wherein the traffic situation traffic information is transmitted as a digital radio broadcast.

11. A process according to claim 2, including defining one zone between every two successive path points of the entire route.

12. A process according to claim 11, including defining the zone in the terminal unit as a corridor between two lines parallel to a line connecting the successive path points at a predetermined distance from the connection line.

13. A process according to claim 12, wherein the zone has a constant width along the route.

14. A process according to claim 2, including transmitting traffic information concerning a traffic situation by radio.

15. A process according to claim 14, wherein the traffic situation traffic information is transmitted by mobile radio.

16. A process according to claim 15, wherein the traffic situation traffic information is transmitted by GSM SMS.

* * * * *